I US008462777B2

United States Patent
Khanduri (10) Patent No.: US 8,462,777 B2
(45) Date of Patent: Jun. 11, 2013

(54) SYSTEM AND METHOD FOR IMPLEMENTING A MULTISTAGE NETWORK USING A TWO-DIMENSIONAL ARRAY OF TILES

(75) Inventor: Puneet Khanduri, Redwood City, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 13/542,944

(22) Filed: Jul. 6, 2012

(65) Prior Publication Data

US 2012/0269191 A1    Oct. 25, 2012

Related U.S. Application Data

(62) Division of application No. 12/335,226, filed on Dec. 15, 2008, now Pat. No. 8,265,070.

(51) Int. Cl.
*H04L 12/50* (2006.01)
*H04L 12/28* (2006.01)

(52) U.S. Cl.
USPC ............ 370/387; 370/388; 370/400; 370/411

(58) Field of Classification Search
USPC ........................................ 370/387
See application file for complete search history.

(56) References Cited

U.S. PATENT DOCUMENTS

| | | | | |
|---|---|---|---|---|
| 4,201,891 A * | 5/1980 | Lawrence et al. | | 370/361 |
| 4,516,238 A | 5/1985 | Huang et al. | | |
| 5,345,444 A | 9/1994 | Cloonan et al. | | |
| 5,852,740 A * | 12/1998 | Estes | | 712/15 |
| 5,963,554 A * | 10/1999 | Song | | 370/395.1 |
| 6,211,979 B1 | 4/2001 | Kang et al. | | |
| 6,301,247 B1 * | 10/2001 | Larson et al. | | 370/387 |
| 6,504,841 B1 | 1/2003 | Larson et al. | | |
| 7,483,391 B2 * | 1/2009 | Xu et al. | | 370/254 |
| 7,684,389 B2 * | 3/2010 | Beshai | | 370/387 |
| 8,050,256 B1 | 11/2011 | Bao et al. | | |
| 8,181,168 B1 | 5/2012 | Lee et al. | | |
| 8,265,070 B2 * | 9/2012 | Khanduri | | 370/387 |
| 2002/0031118 A1 * | 3/2002 | Li et al. | | 370/360 |
| 2003/0118013 A1 | 6/2003 | Steele et al. | | |
| 2009/0216924 A1 | 8/2009 | Bennett | | |
| 2010/0122035 A1 * | 5/2010 | Strumpen et al. | | 711/136 |
| 2011/0037498 A1 | 2/2011 | Konda | | |

* cited by examiner

*Primary Examiner* — Timothy J Weidner (74) *Attorney, Agent, or Firm* — Osha Liang LLP (57) ABSTRACT

A network, including: a first tile having a processor, a top brick connected to the processor, a first bottom brick, and a first intermediate brick; a second tile having a second intermediate brick and a second bottom brick; multiple connections connecting the top brick with the second intermediate brick and the first intermediate brick with the second bottom brick using a passthrough on an intermediate tile between the first and second tiles, where the first, intermediate, and second tiles are positioned in a row; and a third tile having a plurality of caches connected to a third bottom brick, where the second and third tiles are positioned in a column, and the first bottom brick, second bottom brick, and third bottom brick belong to a bottom layer of the network, and where the first and second intermediate bricks belong to an intermediate layer of the network.

5 Claims, 9 Drawing Sheets

SYSTEM AND METHOD FOR IMPLEMENTING A MULTISTAGE NETWORK USING A TWO-DIMENSIONAL ARRAY OF TILES

CROSS-REFERENCE TO RELATED APPLICATIONS

This application is a divisional of U.S. patent application Ser. No. 12/335,226, filed on Dec. 15, 2008, and entitled: "SYSTEM AND METHOD FOR IMPLEMENTING A MULTI-STAGE NETWORK USING A TWO-DIMENSIONAL ARRAY OF TILES." Accordingly, this application claims benefit of U.S. patent application Ser. No. 12/335,226 under 35 U.S.C. §120. U.S. patent application Ser. No. 12/335,226 is hereby incorporated in its entirety.

BACKGROUND

Multistage networks (e.g., Omega networks, Clos networks, Butterfly networks, Banyan networks, etc.) allow for a large number of hosts to connect with each other by implementing multiple switching layers using smaller switching elements. Multistage networks can be highly fault-tolerant and reliable when multiple switches are linked to allow for redundant paths between multiple source and destination pairs.

On-chip networks that connect multiple processor tiles on the same chip are typically implemented using a rectangular topology. A rectangular topology is easy to layout and requires only point-to-point links between physically adjacent tiles on the chip. The replication of identical logic blocks in the form of a two-dimensional array can be referred to as "tiled architecture" and has recently emerged as a new trend in the multi-core processor space.

SUMMARY

In general, in one aspect, the invention relates to a system for implementing a multistage network. The system comprises a first tile comprising a processor, a first top brick operatively connected to the processor, a first bottom brick, and a first intermediate brick; a second tile comprising a second intermediate brick and a second bottom brick; a first plurality of connections operatively connecting the first top brick with the second intermediate brick and the first intermediate brick with the second bottom brick using a passthrough on an intermediate tile between the first tile and the second tile, wherein the first tile, the intermediate tile, and the second tile are positioned in a row of a two-dimensional array; a third tile comprising a cache operatively connected to a third bottom brick, wherein the second tile and the third tile are positioned in a column of the two-dimensional array; and wherein the first bottom brick, the second bottom brick, and the third bottom brick are associated with a bottom layer of the multistage network linking the processor and the cache, and wherein the first intermediate brick and the second intermediate brick are associated with an intermediate layer of the multistage network.

In general, in one aspect, the invention relates to a method for implementing a multistage network. The method comprises: obtaining a design for the multistage network, wherein the multistage network comprises a top layer, a bottom layer, and an intermediate layer; obtaining a plurality of tiles based on the design of the multistage network; positioning a first tile, a second tile and a third tile of the plurality of tiles in a row based on the design, wherein the second tile comprises a passthrough; positioning a fourth tile of the plurality of tiles in a column with the third tile; implementing a plurality of switches on the plurality of tiles according to the design; and connecting the third tile to the first tile using the passthrough of the second tile, wherein each of the plurality of switches comprise a plurality of logical bricks corresponding to the top layer, the bottom layer, and the intermediate layer of the multistage network.

In general, in one aspect, the invention relates to a method for implementing a multistage network. The method comprises: obtaining a design for the multistage network, wherein the multistage network comprises a top layer, a bottom layer, and an intermediate layer; obtaining a plurality of tiles based on the design of the multistage network; positioning a first tile, a second tile and a third tile of the plurality of tiles in a row based on the design, wherein the second tile comprises a passthrough; positioning a fourth tile of the plurality of tiles in a column with the third tile; implementing a plurality of switches on the plurality of tiles according to the design; and connecting the third tile to the first tile using the passthrough of the second tile, wherein each of the plurality of switches comprise a plurality of logical bricks corresponding to the top layer, the bottom layer, and the intermediate layer of the multistage network.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system for implementing a multistage network (e.g., Omega network, Clos network, Butterfly network, Banyan network, etc.) using a two-dimensional (2D) array of tiles. Each tile includes a switch, and each switch has a direct logical connection (e.g., using proximity communication and/or passthroughs) to the switch of every other tile in the same row or column. Further, each switch includes multiple logical bricks corresponding to the multiple layers of the multistage network being implemented. Network traffic is routed between multiple logical bricks on a tile, and between multiple logical bricks on different tiles in the 2D array.

In general, embodiments of the invention provide a method for implementing a multistage network (e.g., Omega network, Clos network, Butterfly network, Banyan networks, etc.) using a 2D array of tiles. Based on a design of the multistage network, multiple tiles are obtained and positioned into rows and columns. A switch is implemented on each tile based on the design, and the switch of each tile is connected (e.g., using proximity connection and/or passthroughs) to the switch of every other tile in the same row or column. Further, each switch includes multiple logical bricks corresponding to the multiple layers of the multistage network. Network traffic is routed between multiple logical bricks on a tile, and between multiple logical bricks on different tiles in the 2D array.

In general, embodiments of the invention provide a method for operating a multistage network (e.g., Omega network, Clos network, Butterfly network, Banyan network, etc.) implemented using a 2D array of tiles. A request for a data element is obtained (e.g., from a processor) at a source tile, a target tile storing the data element (e.g., in a cache) is identified, and the request is routed (e.g., using proximity communication and/or passthroughs) to the target tile using the switch of the source tile, the switch of the target tile, and the switch of a transit tile. The transit tile has a direct logical connection to at least one of the source tile and the target tile. Further, each switch includes multiple logical bricks corresponding to the multiple layers of the multistage network. Network traffic is routed between multiple logical bricks on a tile, and between multiple logical bricks on different tiles in the 2D array.

Figure 1:
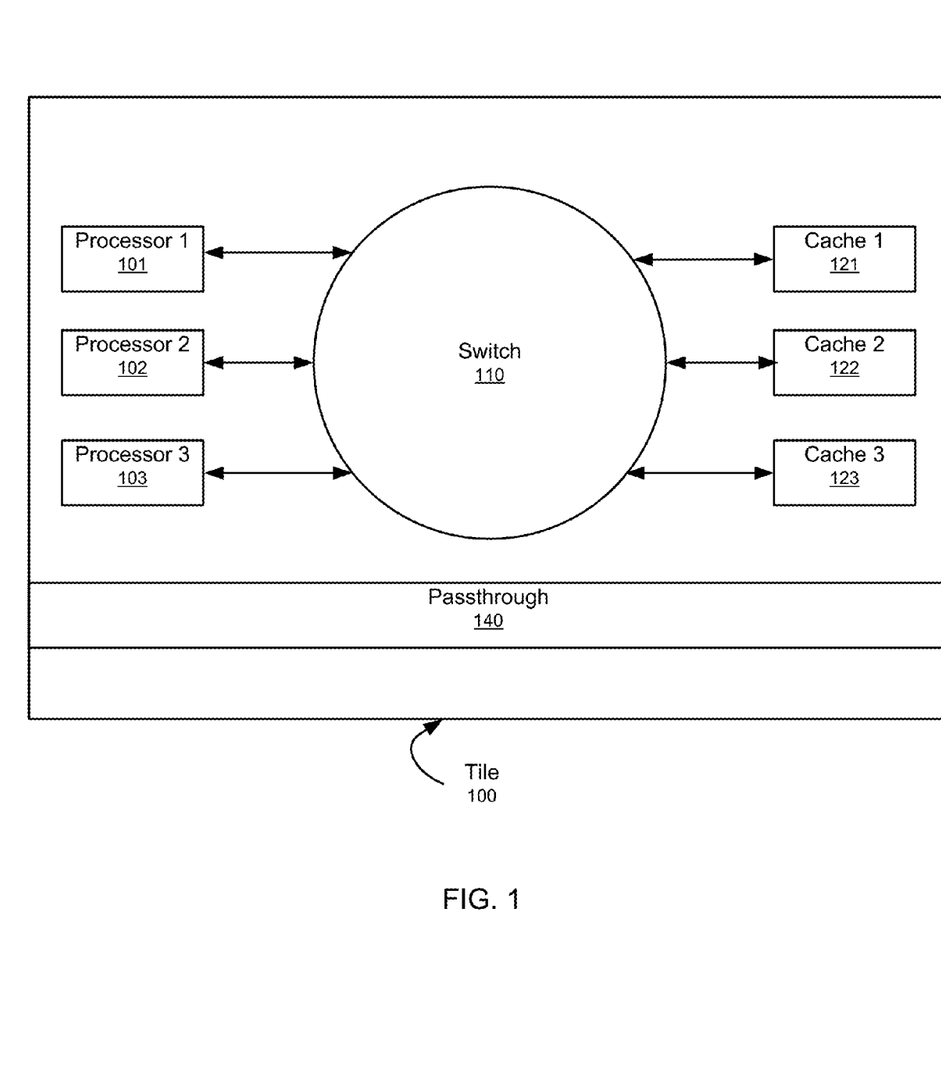
FIG. 1 shows a tile in accordance with one or more embodiments of the invention.

FIG. 1 shows a tile (100) in accordance with one or more embodiments of the invention. As shown in FIG. 1, the tile (100) has numerous components including one or more processors (i.e., Processor 1 (101), Processor 2 (102), Processor 3 (103)), one or more cache memories (i.e., Cache 1 (121), Cache 2 (122), Cache 3 (123)), a switch (110), and a passthrough (140). As also shown in FIG. 1, the one or more processors (101, 102, 103) and the one or more caches (121, 122, 123) are operatively connected to the switch (110). These connections may be referred to as host ports. In one or more embodiments of the invention, the processors (101, 102, 103) are directly connected to the caches (121, 122, 123), without using the switch. In other words, connections between the processors (101, 102, 103) and the caches (121, 122, 123) exist that effectively bypass the switch (110).

In one or more embodiments of the invention, all incoming connections to the tile (100) and all outgoing connections from the tile (100) are connected to the switch (110) or the passthrough (140). The switch (110) is configured to route incoming network traffic (e.g., requests for data items issued by a processor) to a destination tile (not shown) by effectively connecting or disconnecting a circuit between the tile (100) and the destination tile. Each switch (110) comprises multiple logical corresponding to the multiple layers of a multistage network (discussed below). Those skilled in the art, having the benefit of this detailed description, will appreciate that operation of the switch (110) introduces delays in moving the network traffic to the destination tile.

In one or more embodiments of the invention, the passthrough (140) forwards network traffic between two tiles (not shown) that are both adjacent to the tile (100). The passthrough (140) does not make use of the switch (110). Accordingly, the passthrough (140) does not suffer from the delays of the switch (110). The processors (101, 102, 103) and/or switch (110) may be configured to monitor (e.g., snoop) traffic on the passthrough (140). The passthrough (140) may be implemented, for example, using one or more shifted sets (discussed below) and/or using programmable wires.

Figure 2:
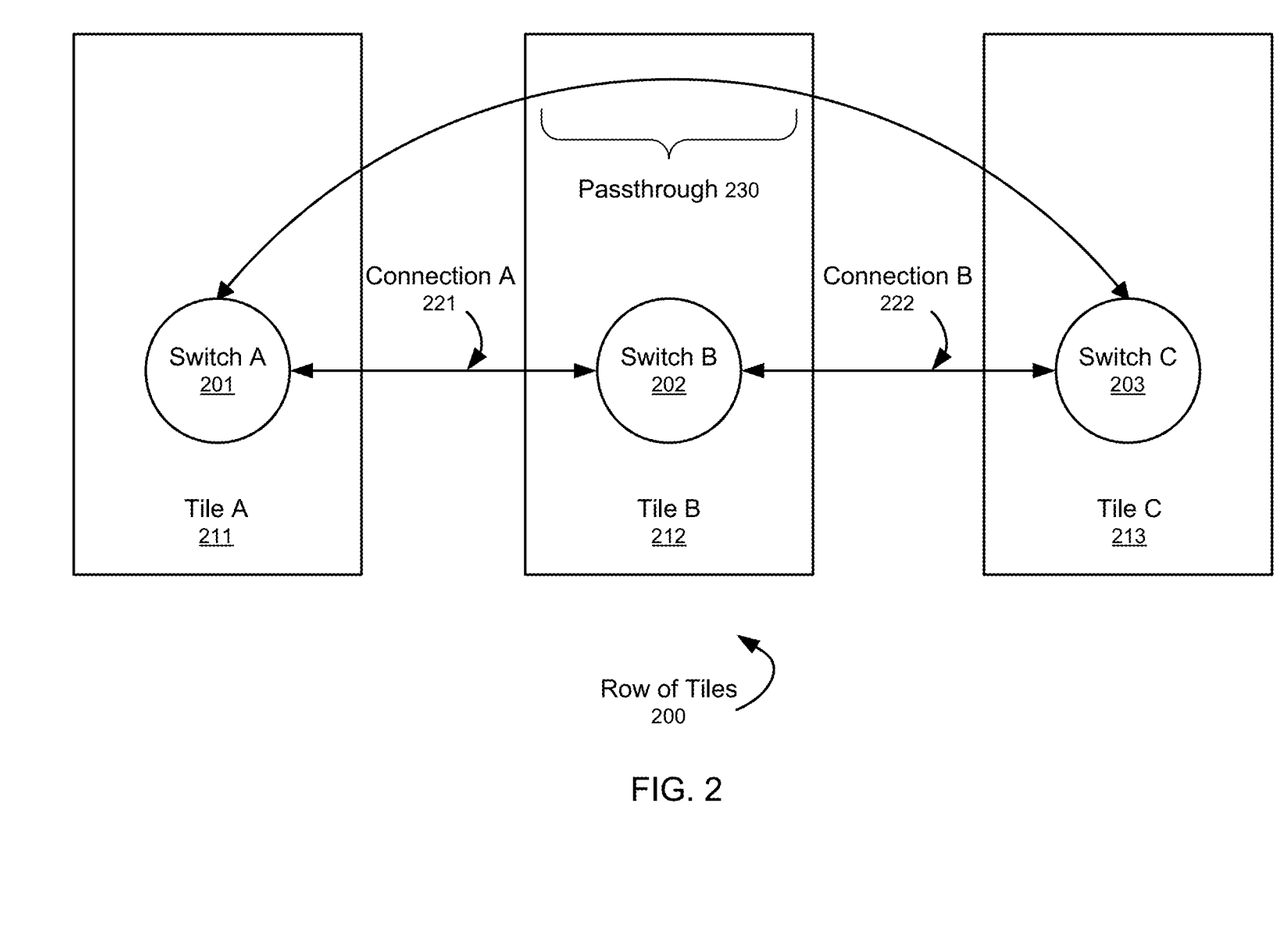
FIG. 2 shows a row of tiles in accordance with one or more embodiments of the invention.

FIG. 2 shows a row of tiles (200) in accordance with one or more embodiments of the invention. As shown in FIG. 2, the row of tiles (200) includes Tile A (211), Tile B (212), and Tile C (213). Each of the tiles (211, 212, 213) may be essentially the same as the tile (100), discussed above in reference to FIG. 1. Further, although the row of tiles (200) is shown as having three tiles (211, 212, 213), the row of tiles (200) may have any number of tiles.

Still referring to FIG. 2, switch A (201) of tile A (211) is directly connected to switch B (209) of tile B (212) using connection A (221). Similarly, switch B (202) is directly connected to switch C (203) of tile C (213) using connection B (222). In one or more embodiments of the invention, connection A (221) and connection B (222) are implemented using proximity communication between the tiles (211, 212, 213). As also shown in FIG. 2, tile B (212) includes a passthrough (230) to provide a direct logical connection between switch A (201) on tile A (211) and switch C (203) on tile C (213) (i.e., two non-adjacent tiles in the row of tiles (200)). Accordingly, by using the passthrough (230), traffic may be passed between switch A (201) and switch C (203) without triggering switch B (202).

Those skilled in the art, having the benefit of this detailed description, will appreciate that connection A (221), connection B (222), and the passthrough (230) effectively create direct logical connections from the switch of each tile to the switch of every other tile in the row, including non-adjacent tiles in the row. These direct logical connections may be referred to as "all-to-all" connectivity.

Figure 3:
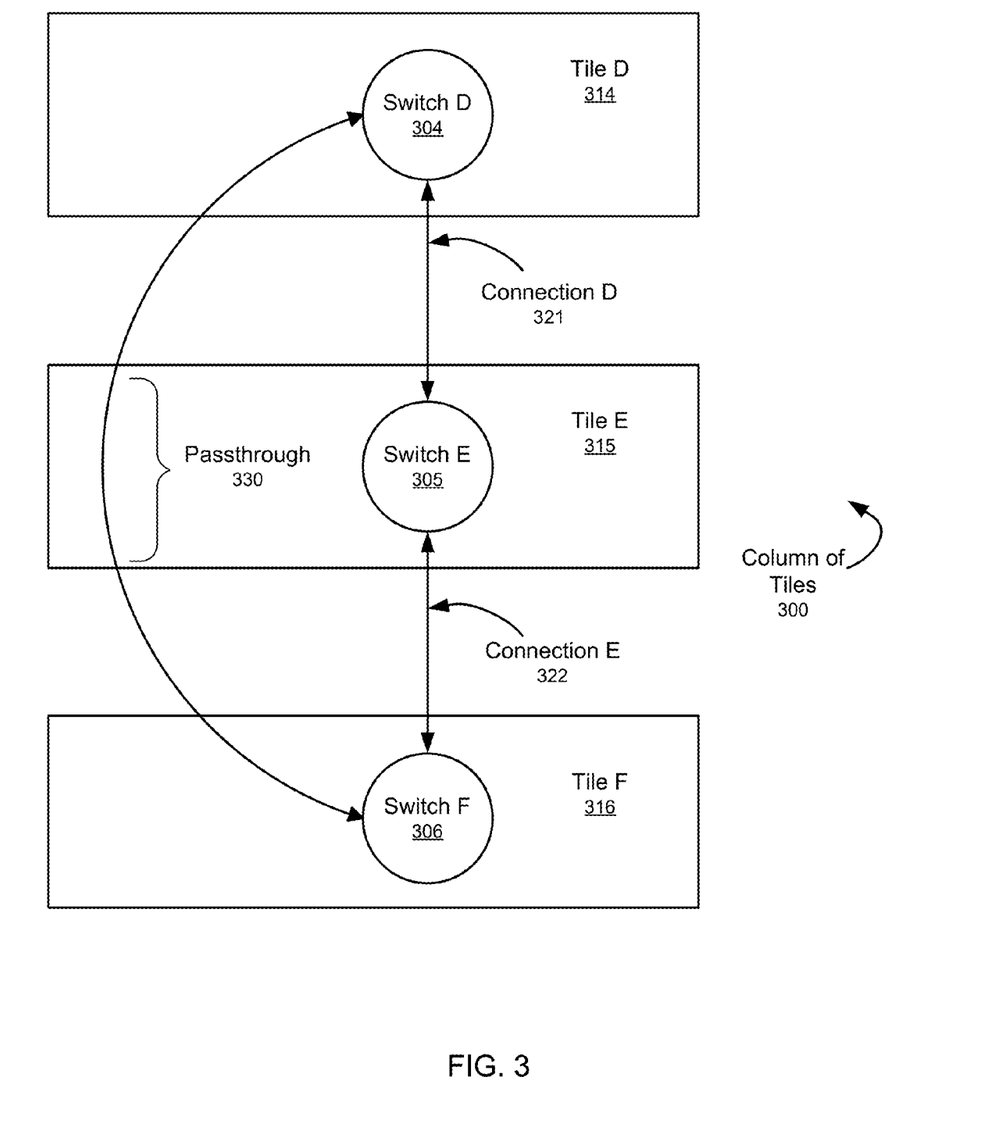
FIG. 3 shows a column of tiles in accordance with one or more embodiments of the invention.

FIG. 3 shows a column of tiles (300) in accordance with one or more embodiments of the invention. As shown in FIG. 3, the column of tiles (300) includes tile D (314), tile E (315), and tile F (316). Each of the tiles (314, 315, 316) may be essentially the same as the tile (100), discussed above in reference to FIG. 1. Further, although the column of tiles (300) is shown as having three tiles (314, 315, 316), the column of tiles (300) may have any number of tiles.

Still referring to FIG. 3, switch D (304) of tile D (314) is directly connected to switch E (305) of tile E (315) using connection D (321). Similarly, switch E (305) is directly connected to switch F (306) of tile F (316) using connection E (322). In one or more embodiments of the invention, connection D (321) and connection E (322) are implemented using proximity communication between the tiles (314, 315, 316). As also shown in FIG. 3, tile E (315) includes a passthrough (330) to provide a direct logical connection between switch D (304) on tile D (314) and switch F (306) on tile F (316) (i.e., two non-adjacent tiles in the column of tiles (300)). Accordingly, by using the passthrough (330), traffic may be passed between switch D (304) and switch F (306) without triggering switch E (305).

Those skilled in the art, having the benefit of this detailed description, will appreciate that connection D (321), connection E (322), and the passthrough (330) effectively create direct logical connections from the switch of each tile to the switch of every other tile in the column, including non-adjacent tiles in the column. These direct logical connections may be referred to as "all-to-all" connectivity.

As discussed above, two physically non-adjacent tiles can be directly connected in tiled architectures by implementing passthroughs on the one or more intermediate tiles between the non-adjacent tiles. These passthroughs may be implemented using wire bundles or metal traces that pass through the one or more intermediate tiles and enable direct point-to-point links between non-adjacent tiles. In one or more embodiments of the invention, shifted sets may be used to implement "all-to-all" connectivity within a row of tiles or a column of tiles.

Figure 4:
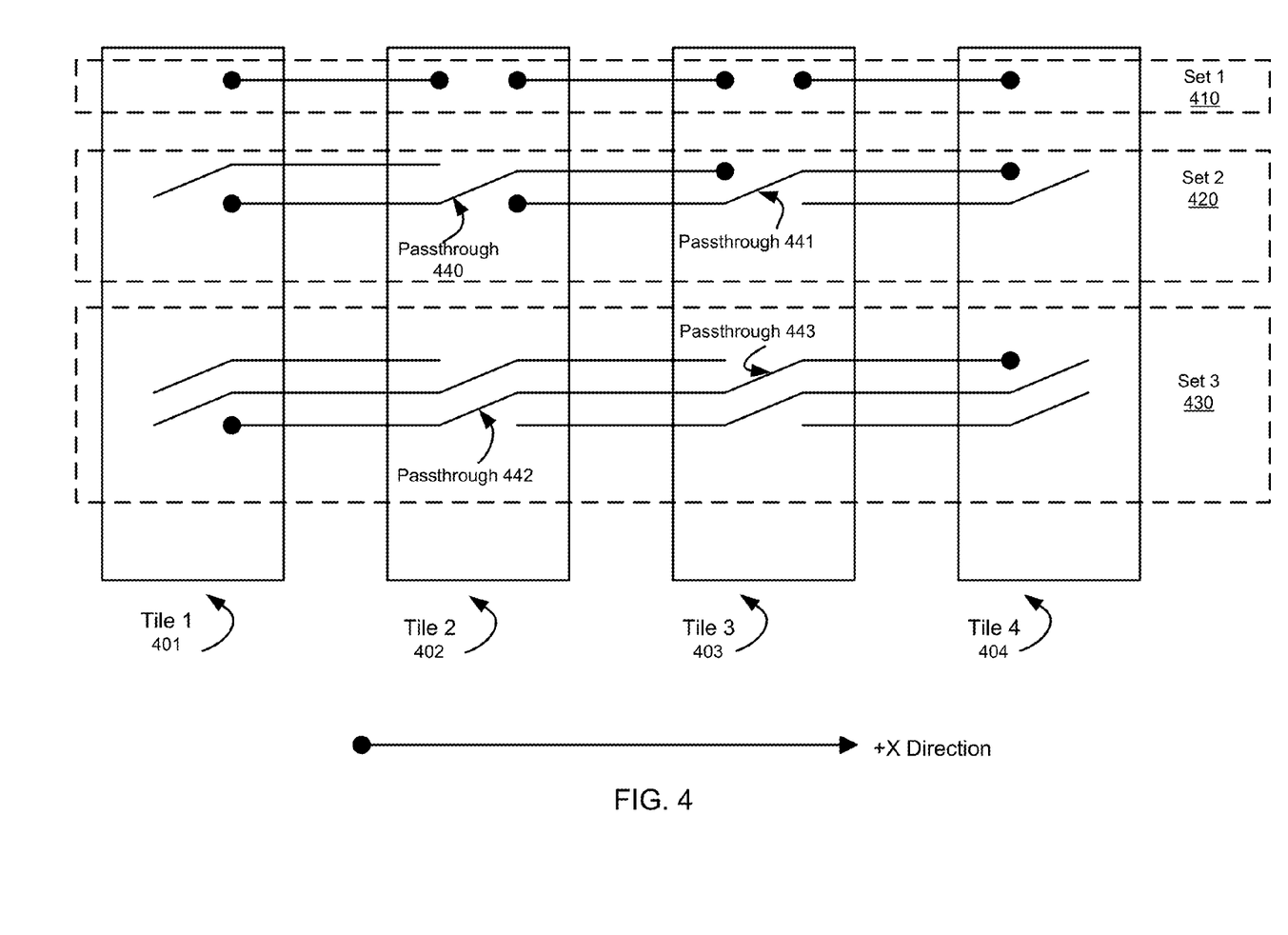
FIG. 4 shows multiple shifted sets in accordance with one or more embodiments of the invention.

FIG. 4 shows multiple shifted sets (i.e., Set 1 (410), Set 2 (420), Set 3 (430)) in accordance with one or more embodiments of the invention. As shown in FIG. 4, each tile (i.e., Tile 1 (401), Tile 2 (402), Tile 3 (403), Tile (404)) implements "all-to-all" unidirectional wire bundles in the +X direction. In other words, the shifted sets (410, 420, 430) effectively connect the tiles (401, 402, 403, 404) in the +X direction. Additional wire bundles are needed (not shown) to connect the tiles (401, 402, 403, 404) in the −X direction (or any other direction). A bundle includes N*(N−1)/2 wires, where "all-to-all" connectivity is required between N tiles (e.g., N=4 in FIG. 4). Each bundle is partitioned into N−1 sets (i.e., Set 1 (410), Set 2 (420), Set 3 (430)), and each set comprises a unique number of wires ranging from 1 to N−1.

As shown in FIG. 4, Set 1 (410) includes one wire connecting a tile to its physically adjacent neighbor (e.g., Tile 1 (401) to Tile 2 (402), Tile 2 (402) to Tile 3 (403), Tile 3 (403) to Tile 4 (404)) in the +X direction. Accordingly, Set 1 (410) does not implement any passthroughs. Set 2 (420) includes two wires connecting a tile to its neighbor's neighbor by passing through the intervening tile (e.g., Tile 1 (401) to Tile 3 (403), Tile 2 (402) to Tile 4 (404)) in the +X direction. Accordingly, Set 2 (420) implements two non-consecutive passthroughs (440, 441). Set 3 (430) includes three wires connecting tile 1 (401) to tile 4 (404) in the +X direction. Accordingly, Set 3 (430) implements two consecutive passthroughs (442, 443). Those skilled in the art, having the benefit of this detailed description, will appreciate that the number of sets grow linearly with the maximum number of consecutive passthroughs needed, and the size of bundle grows quadratically with N. Further, those skilled in the art, having the benefit of this detailed description, will appreciate that segments of the wires between tiles (401-404) may be implemented using proximity communication.

Figure 5:
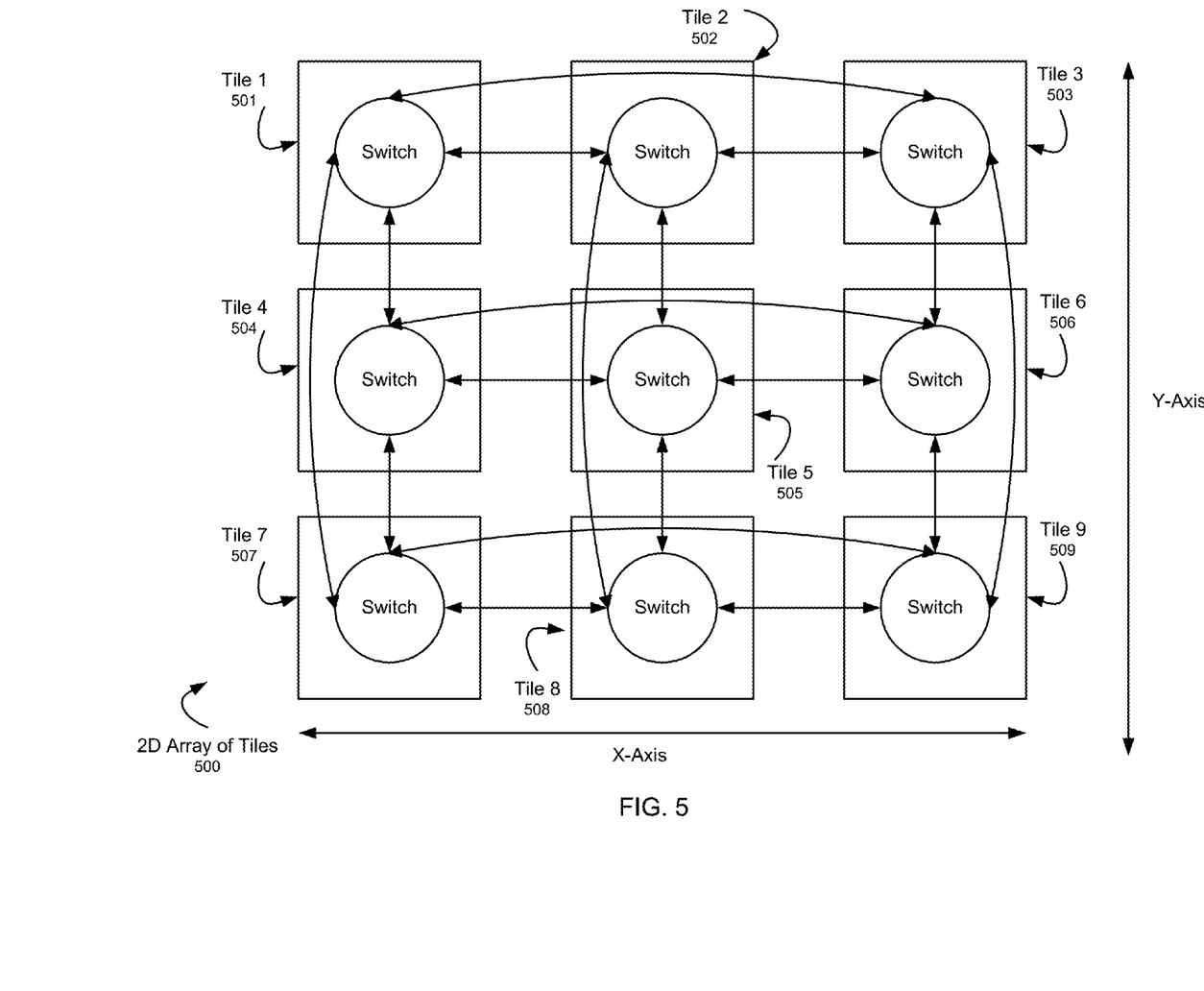
FIG. 5 shows a 2D array of tiles in accordance with one or more embodiments of the invention.

FIG. 5 shows a 2D array of tiles (500) in accordance with one or more embodiments of the invention. The 2D array of tiles (500) is a square array comprising nine tiles (i.e., Tile 1 (501), Tile 2 (502), Tile 3 (503), Tile 4 (504), Tile 5 (505), Tile 6 (506), Tile 7 (507), Tile 8 (508), Tile 9 (509)). Although the 2D array of tiles (500) is shown as a 3×3 array, the 2D array of tiles (500) may be of any size.

Each of the tiles (501-509) may be essentially the same as the tile (100) discussed above in reference to FIG. 1. As also shown in FIG. 5, each tile (501-509) includes a switch and each tile (501-509) is connected to neighboring tiles in both the X and Y directions. Direct physical connections exist between adjacent tiles in both the X and Y directions, and direct logical connections exist between non-adjacent tiles in both the X and Y directions using passthroughs, which pass signals through intermediate tiles without routing or modifying the signals (discussed above). In one or more embodiments of the invention, each tile (501-509) is a chip in a multi-chip module (MCM). Alternatively, each tile (501-509) may be a processor tile in an on-chip network.

Figure 6:
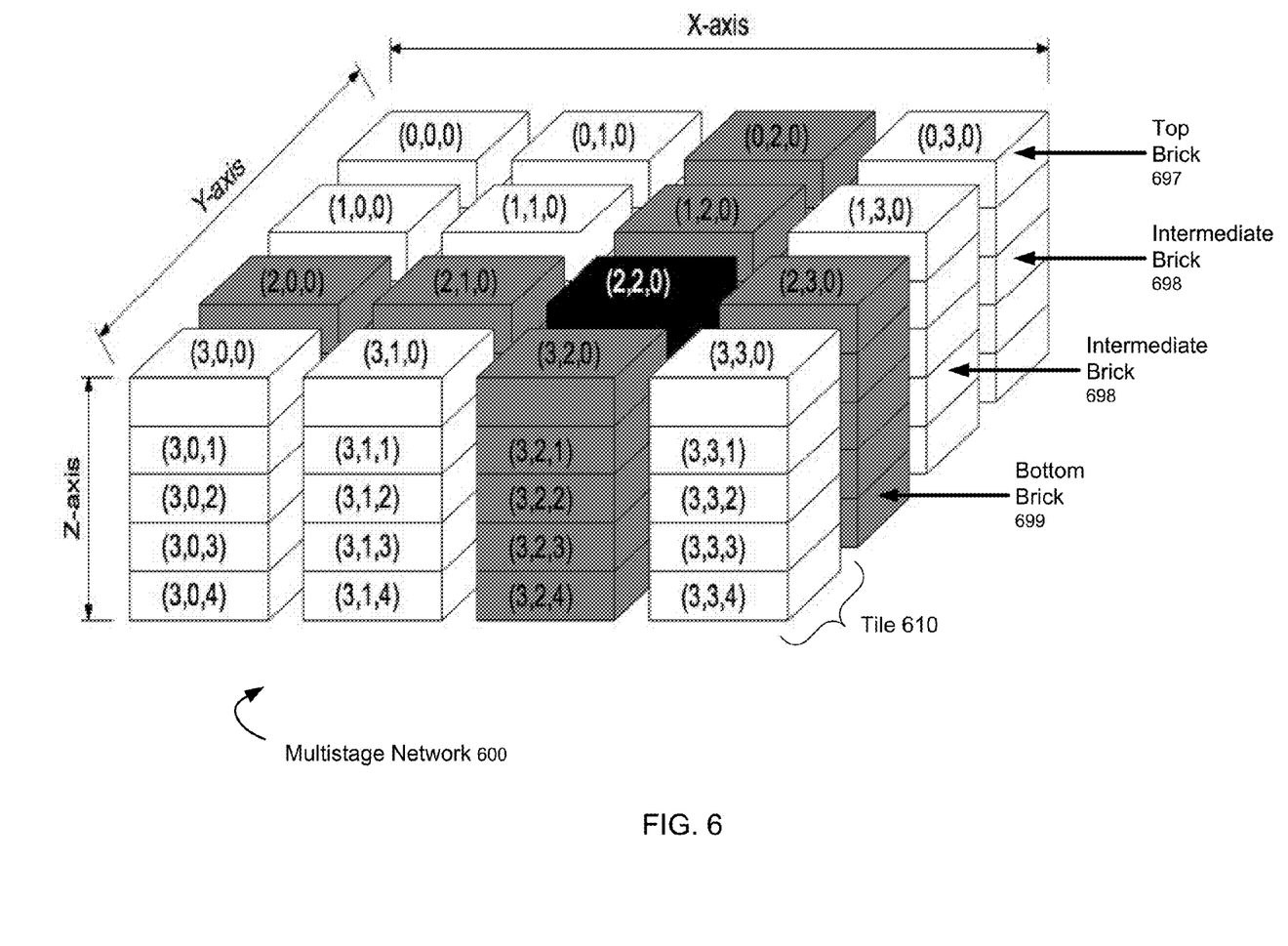
FIG. 6 shows a system in accordance with one or more embodiments of the invention.

FIG. 6 shows a multistage network (600) in accordance with one or more embodiments of the invention. The multistage network (600) is implemented using a 2D array of tiles (e.g., 2D Array of Tiles (500), discussed above in reference to FIG. 5). As shown in FIG. 6, each tile (e.g., Tile (610)) includes multiple logical bricks (e.g., top brick (697), one or more intermediate bricks (698), bottom brick (699)) which act as small switching elements in the larger multistage network (600). The multiple logical bricks (697, 698, 699) correspond to the multiple layers of the multistage network. For example, the logical aggregation of all the top bricks (697) on all tiles is considered the top layer of the multistage network (600). Similarly, other corresponding bricks (e.g., intermediate brick (698), bottom brick (699)) form additional layers of the multistage network (600). Accordingly, both the number of logical bricks per tile, and the number of tiles in the 2D array are determined based on the multistage network being implemented.

In one or more embodiments of the invention, all bricks within a tile are physically realized on the tile. In other words, the multiple logical bricks turn the physical 2D array of tiles into a logical 3D array. Both the top bricks (697) and the bottom bricks (699) connect with external components (e.g., processor and/or memory caches) to be linked by the multistage network (600). A logic brick on a tile may route network traffic to both other logical bricks on the tile and logical bricks on other tiles in the same row or column. The protocol for routing network traffic between logical bricks within a tile, and between logical bricks of different tiles is set by the design of the multistage network being implemented. In other words, the multiple logical bricks are programmed to operate (i.e., route network traffic) in accordance with the type or design of the multistage network (e.g., Omega network, Clos network, Butterfly network, Banyan networks, etc.).

In one or more embodiments of the invention, every brick is referenced using the coordinates (X, Y, Z), where X and Y indicate the physical position of the tile in the 2D array of tiles, and Z indicates the logical position of the brick within the tile (and thus the layer of the multistage network comprising the brick). The multistage network (600) shown in FIG. 6, is a five-layer network. Accordingly, all bricks denoted (*,*, 0) form the top layer of the multistage network (600). Similarly, all bricks denoted (*,*,4) form the bottom layer of the multistage network (600). Further, all bricks denoted (X, Y,*) belong to the same tile. Further, as all tiles in a row or column of a 2D array are connected using direction connections and passthroughs, any brick of type (2,2,*) can either be connected to any brick of type (2,*,*) because they belong to the same column or to any brick of the type (*,2,*) because they belong to the same row.

In one or more embodiments of the invention, the bricks (i.e., top brick (697), one or more intermediate bricks (698), and bottom brick (699)) of a tile are physically realized using individual nodes. These nodes include ports to connect with nodes on the same tile, and to connect with nodes on difference tiles in the same row or column of the 2D array. These nodes also include programmable logic to route network traffic according to the protocol of the multistage network. Those skilled in the art, having the benefit of this detailed description, will appreciate that local network traffic (i.e., network traffic between bricks of a single tile) will experience switching delays at each node in the tile.

In one or more embodiments of the invention, all the bricks of a tile are physically realized using a single full crossbar. In other words, the multiple bricks of a tile may be collapsed into a full crossbar. In such embodiments, local traffic need only go through a single switching element (i.e., the full crossbar), instead of multiple stages. In other words, a full crossbar reduces the overall switching delay for local traffic by allowing local traffic to move between logically non-adjacent layers (e.g., top layer immediately to bottom layer) of the multistage network. The full crossbar effectively merges multiple layers into a single layer. Further, by removing certain points of a full crossbar, the full crossbar may be collapsed to a partial crossbar.

In one or more embodiments of the invention, the logical bricks for a tile are partially realized using individual nodes and partially realized using a full or partial crossbar. In other words, some bricks associated with adjacent logical layers of the multistage network may be implemented using a crossbar, while other bricks associated with adjacent logical layers may implemented using individual nodes, even though all of the bricks are on the same tile.

Figure 7:
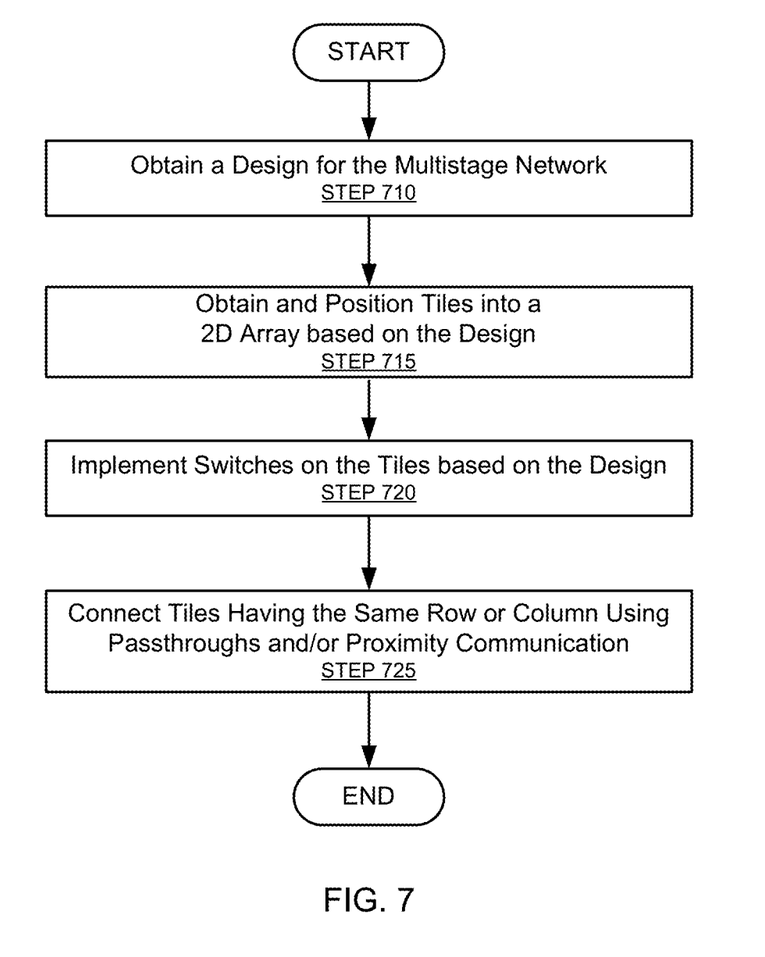
FIG. 7 and FIG. 8 show flowcharts in accordance with one or more embodiments of the invention.

FIG. 7 shows a flowchart in accordance with one or more embodiments of the invention. The process shown in FIG. 7 may be used to implement a multistage network using multiple tiles. Those skilled in the art, having the benefit of this detailed description, will appreciate the sequence of steps shown in FIG. 7 may differ among embodiments of the invention, and that one or more of the steps may be optional.

Initially, a design for the multistage network is obtained (STEP 710). The design may specify a type of multistage network (e.g., Omega network, Clos network, Butterfly network, Banyan network, etc.) to be implemented, and the design may specify the number of external components (e.g., processors, memory caches, etc.) to be linked by the multistage network. The number of tiles required to implement the multistage network may be determined from the design, and the number of logical bricks per tile corresponds to the number of layers in the multistage network.

In STEP 715, the tiles are obtained and positioned into a 2D array (i.e., rows and column) based on the design. In one or more embodiments of the invention, each tile corresponds to a chip in a multi-chip module (MCM). Alternatively, each tile corresponds to a processor tile of an on-chip network. In one or more of the embodiments each tile includes a processor and a memory cache to be connected with the multistage network.

In STEP 720, switches are implemented on each of the tiles. In one or more embodiments of the invention, a switch comprises a plurality of logical bricks. Each brick acts as a small switching device in the multistage network. Although the switch is logically-layered into bricks (e.g., a top brick, one or more intermediate bricks, bottom brick), all the bricks within a switch are physically realized on the tile. Further, the processor on the tile may be connected to the top brick of the multiple bricks. Similarly, the memory cache on the tile may be connected to the bottom brick of the multiple bricks.

In one or more embodiments of the invention, the multiple logical bricks are physically realized using individual nodes. The nodes are programmed based on the design of the multistage network. As discussed above, network traffic may be routed between nodes on the same tile, and between nodes on other tiles in the same row or column, according to the design.

In one or more embodiments of the invention, the multiple logical bricks are physically realized using a full or partial crossbar. In other words, the logical bricks of a tile effectively collapse into a crossbar that behaves as a larger switching element. A full crossbar reduces the overall switching delay for local traffic by allowing local traffic to move between logically non-adjacent layers of the multistage network. The full crossbar effectively merges multiple layers into a single layer. Further, by removing certain points of a full crossbar, the full crossbar may be collapsed to a partial crossbar.

In one or more embodiments of the invention, both individual nodes and crossbars (i.e., a hybrid) are used to physically realize the logical bricks of a single tile.

In STEP 725, all tiles having the same row or the same column in the 2D array are connected. Adjacent tiles may be connected using direct connections (e.g., direct connections implemented using proximity communication). Further, non-adjacent tiles may be connected using a passthrough (or multiple consecutive passthroughs) on an intermediate tile(s) between the non-adjacent tiles. Accordingly, the multiple connections effectively create a direct logical connection between a switch of a tile, and the switch of every other tile in same row or column of the 2D array.

Figure 8:
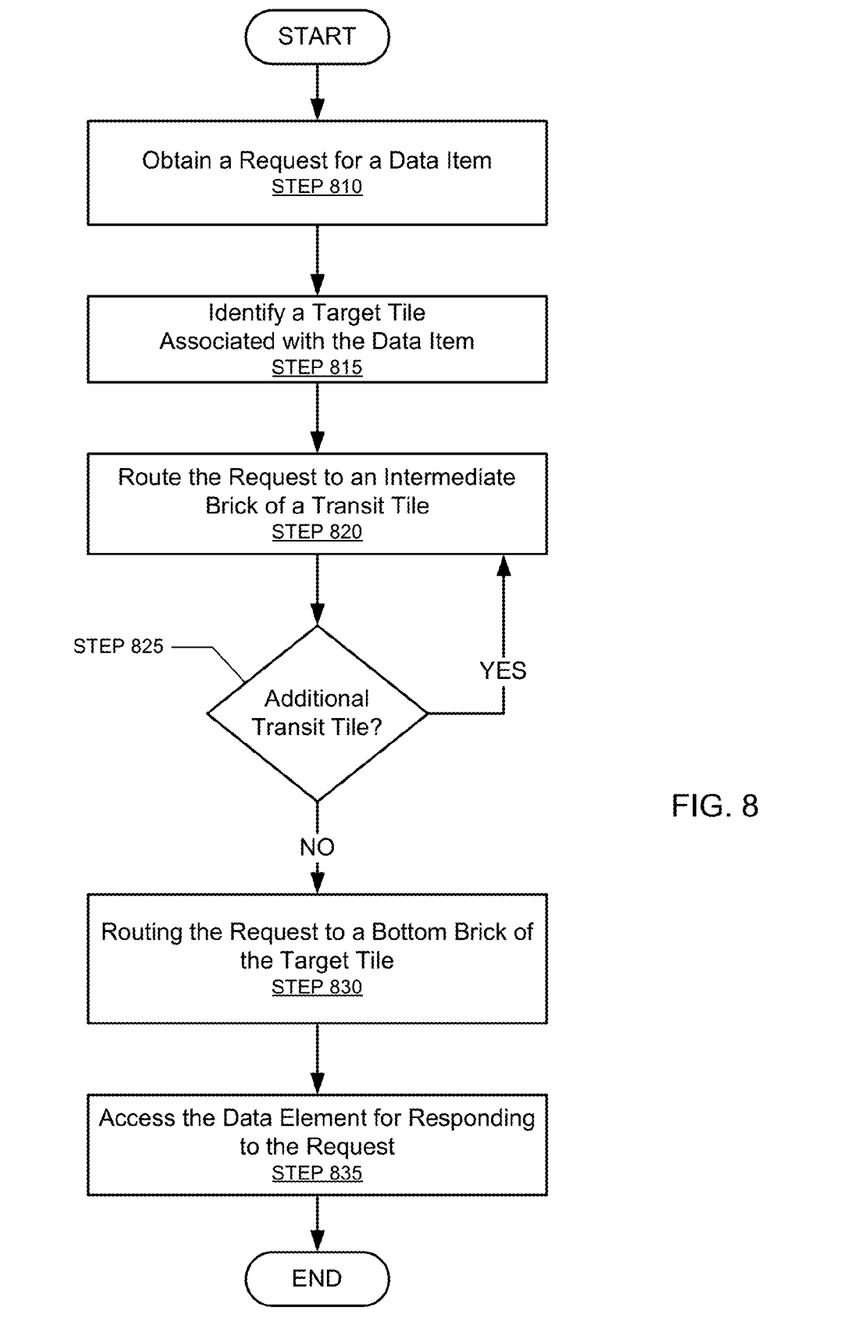

FIG. 8 shows a flowchart in accordance with one or more embodiments of the invention. The process shown in FIG. 8 may be used to operate a multistage network (e.g., Omega networks, Clos networks, Butterfly networks, Banyan networks, etc.) implemented using a 2D array of tiles. Those skilled in the art, having the benefit of this detailed description, will appreciate that the sequence of steps shown in FIG. 8 may differ among embodiments of the invention, and that one or more of the steps may be optional.

Initially, a request for a data element is obtained (STEP 810). The request may be obtained at a source tile in the 2D array of tiles, and the request may be issued by an external component (e.g., a processor located on the source tile). In one or more embodiments of the invention, each tile comprises multiple logical bricks, and each of the multiple logical bricks corresponds to a layer of the multistage network. Further, the top brick of the multiple bricks corresponds to the top layer of the multilayer network. Thus, the top brick is connected to the external component and obtains the request from the external component.

In STEP 815, a target tile associated with the data item is identified. Further, a path from the source tile to the target tile is identified based on the design of the multistage network. The target tile may include a memory cache storing the data item. In other words, the multistage network may effectively link the external component of the source tile with the memory cache of the target tile. Like the source tile, the target tile comprises multiple logical bricks. In one or more embodiments of the invention, the bottom brick of the target tile is connected to the memory cache storing the data item.

In one or more embodiments of the invention, the target tile and the source tile do not belong to the same row or column in the 2D array of tiles. Accordingly, the path from the source tile to the target tile includes one or more transit tiles.

In STEP 820, the request is routed to a transit tile. When STEP 820 is executed for the first time, the transit tile is located in the same row or column as the source tile. Further, when STEP 820 is executed for the first time, the request is moving from the top layer of the multistage network (i.e., top block of the source tile) to an intermediate layer of the multistage network (i.e., intermediate block of the transit tile). Each execution of STEP 820 moves the request to a different intermediate layer and a different transit tile based on the path identified in STEP 815. Further, routing the request between non-adjacent transit tiles may require using the passthroughs of intermediate tiles (discussed above).

In STEP 825, it is determined whether the path includes any additional transit tiles. When it is determined the path includes additional transit tiles, the process returns to STEP 820. When it is determined no additional transit tiles exist, the process proceeds to STEP 830.

Figure 9:
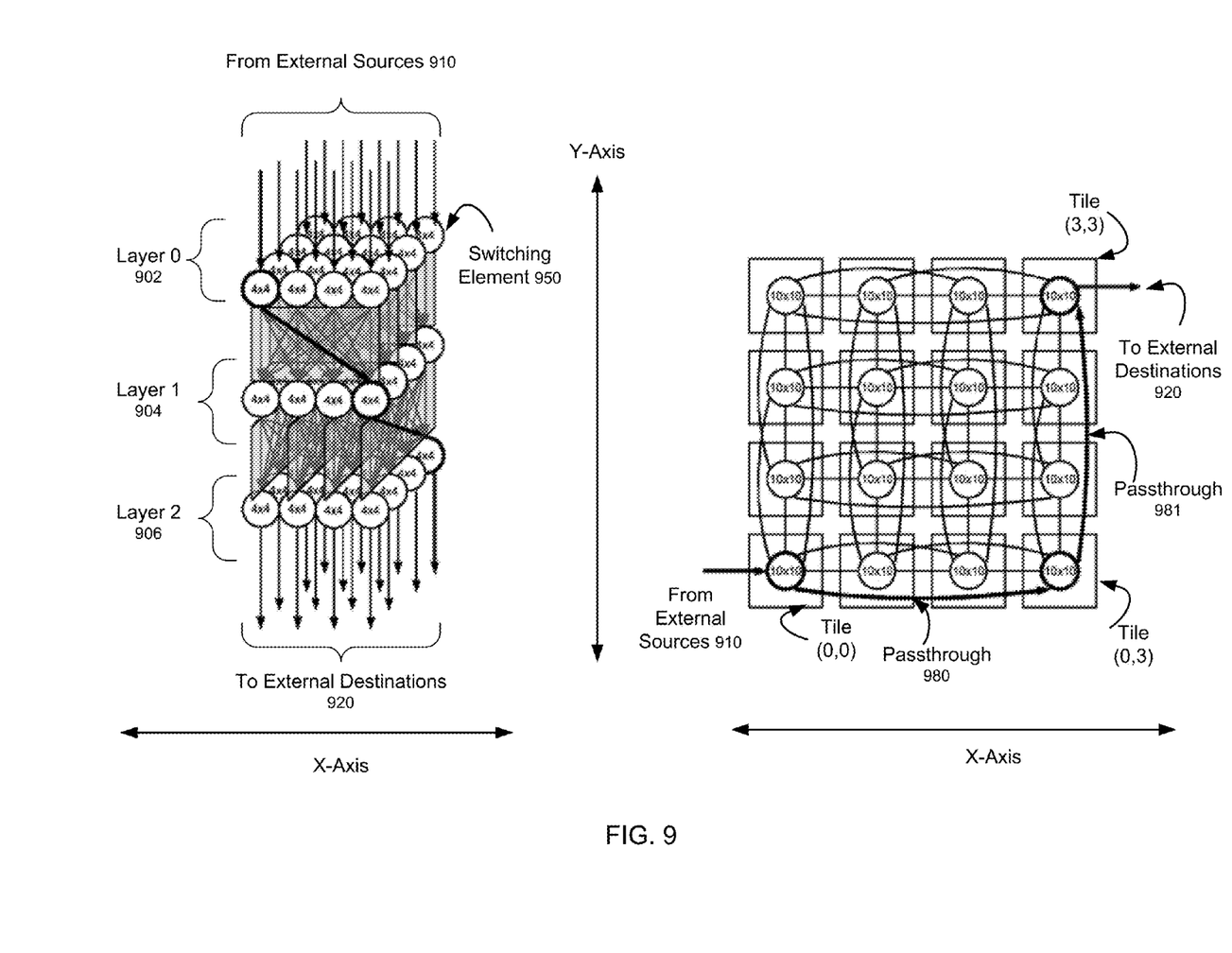
FIG. 9 shows an example in accordance with one or more embodiments of the invention.

In STEP 830, the final transit tile routes the request from an intermediate brick of the final transit tile to the bottom brick of the target tile. In one or more embodiments of the invention, the final transit tile and the target tile are in the same row or column in the 2D array. In STEP 835, the request is used to access the memory cache associated with the data element, and respond to the request FIG. 9 shows an example in accordance with one or more embodiments of the invention. Specifically, FIG. 9 shows both a 3-D model of an omega network and the same omega network implemented using a 2D array of tiles. The omega network comprises three layers (i.e., Layer 0 (902), Layer 1 (904), and Layer 2 (906)), and each layer (902, 904, 906) comprises 16 primitive switching elements or bricks (950). A switching element (910) supports four input ports and four output ports. The inputs of switching elements in Layer 0 (902) are connected to external sources (e.g., processors) (910) and the outputs of Layer 0 (902) are fed as inputs to Layer 1 (904). The outputs of Layer 1 (904) are fed as inputs to Layer 2 (906), and the outputs of Layer 2 (906) are connected to external destinations (908) (e.g., memory caches).

Every switching element in Layer 0 (902) is connected to all switching elements in Layer 1 (904) that lie on the X-axis. This results in all tiles on the same row being fully-connected along the X-axis between Layers 0 and 1. Similarly, every switching element on Layer 1 (904) is connected to all switching elements on Layer 2 (906) that lie on the Y-axis. Hence, the tiles are fully-connected along the Y-axis between Layers 1 and 2.

Still referring to FIG. 9, network traffic received by any switching element on Layer 0 (902) can be sent anywhere along the X-axis to Layer 1 (904). This allows traffic to move between any pair of tiles on the X-axis. Traffic received by any switching element on Layer 1 can be sent anywhere along the Y-axis to Layer 2. This allows traffic to move between any pair of tiles on the Y-axis. A passthroughs (980) allows for traffic from Layer 0 at the tile (0, 0) to reach Layer 1 at the tile (0, 3) without requiring switches on the intermediate tiles to direct traffic, effectively avoiding additional delays. A passthrough (981) also allows for traffic from Layer 1 at tile (0, 3) to reach Layer 2 at tile (3, 3) without requiring the use of switches in the intermediate tiles. Once the traffic has reached its target destination, (e.g., tile (3, 3)), the traffic is then sent to an external source.

Those skilled in the art, having the benefit of this detailed description, will appreciate that one or more embodiments of the invention offer a novel manner to implement multistage interconnects such as Omega and Clos networks within 2D mesh structures. This enables large scale systems (e.g., large multi-core processors and large switches) to be built on 2D multi-chip modules (MCMs). Further, one or more embodiments of the invention allow large multistage switch fabrics to be easily embedded in proximity communication using 2D meshes. Further still, one or more embodiments of the invention simplifies the physical layout of a multistage network within 2D meshes, which enables low-latency multistage interconnects for multi-core processors as single-chip implementations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a multistage network, comprising:
   obtaining, at a source tile in a two-dimensional (2D) array, a request for a data element, wherein the source tile comprises a top brick associated with a top layer of the multistage network and is operatively connected to a processor issuing the request;
   identifying a target tile in the 2D array comprising a bottom brick, wherein the bottom brick is operatively connected to a cache storing the data element, and wherein the bottom brick is associated with a bottom layer of the multistage network;
   routing the request to an intermediate brick of a transit tile in the 2D array, wherein routing the request to the intermediate brick comprising forwarding the request through an adjacent tile in the 2D array using a passthrough of the adjacent tile, wherein the intermediate brick is associated with an intermediate layer of the multistage network;
   routing the request to the bottom brick of the target tile after routing the request to the intermediate brick; and
   accessing the data element in the cache for responding to the request.

2. The method of claim 1, wherein a row of the 2D array comprises the transit tile and the source tile, and wherein a column of the 2D array comprises the transit tile and the target tile.

3. The method of claim 1, wherein the source tile, the transit tile, and the target tile are chips in a multi-chip module (MCM), and wherein routing the request to the intermediate brick comprises using proximity communication.

4. The method of claim 1, wherein at least one selected from a group consisting of the top brick, the intermediate brick, and the bottom brick is included in a partial crossbar.

5. The method of claim 1, wherein the top brick, the bottom brick, and the intermediate brick are nodes programmed based on a design of the multistage network.

* * * * *